(12) United States Patent
Mundell et al.

(10) Patent No.: US 7,309,105 B2
(45) Date of Patent: Dec. 18, 2007

(54) LIFT WIRE LUMBAR

(75) Inventors: Donald D. Mundell, Carthage, MO (US); Joe Reu, Sarcoxie, MO (US)

(73) Assignee: L&P Property Management Company, South Gate, CA (US)

( * ) Notice: Subject to any disclaimer, the term of this patent is extended or adjusted under 35 U.S.C. 154(b) by 77 days.

(21) Appl. No.: 11/328,326

(22) Filed: Jan. 9, 2006

(65) Prior Publication Data
US 2007/0158985 A1    Jul. 12, 2007

(51) Int. Cl.
B60N 2/36    (2006.01)
(52) U.S. Cl. ............... 297/284.4; 297/284.7; 297/378.12
(58) Field of Classification Search ......... 297/284.4, 297/284.7, 378.12
See application file for complete search history.

(56) References Cited

U.S. PATENT DOCUMENTS

| | | | |
|---|---|---|---|
| 2,274,176 A | 2/1942 | Widman |
| 2,418,787 A | 4/1947 | Nelson |
| 2,855,984 A | 10/1958 | Majorana et al. |
| 3,121,585 A | 2/1964 | Krueger et al. |
| 3,202,453 A | 8/1965 | Richards |
| 3,241,879 A | 3/1966 | Castello et al. |
| 3,246,924 A | 4/1966 | Krueger et al. |
| 3,271,076 A | 9/1966 | Smith |
| 3,273,877 A | 9/1966 | Geller et al. |
| 3,363,941 A | 1/1968 | Wierwille |
| 3,416,839 A | 12/1968 | Flint |
| 3,550,953 A | 12/1970 | Neale |
| 3,695,688 A | 10/1972 | Wize |
| 3,927,911 A | 12/1975 | Rosquist |
| 3,967,852 A | 7/1976 | Eiselt et al. |
| 3,983,640 A | 10/1976 | Cardullo et al. |
| 3,992,059 A | 11/1976 | Kloepfer |
| 4,105,245 A | 8/1978 | Simons et al. |
| 4,155,592 A | 5/1979 | Tsuda et al. |
| 4,190,286 A | 2/1980 | Bentley |
| 4,354,709 A | 10/1982 | Schuster |
| 4,368,916 A | 1/1983 | Blasin |
| 4,428,611 A | 1/1984 | Widmer |

(Continued)

FOREIGN PATENT DOCUMENTS

DE    4232679 C1    2/1994

(Continued)

OTHER PUBLICATIONS

PCT International Search Report for PCT/US2007/060207.

*Primary Examiner*—Rodney B. White
(74) *Attorney, Agent, or Firm*—Husch & Eppenberger LLC; Grant D. Kang

(57) ABSTRACT

An adjustable lumbar support for a seat comprising a pair of parallel lateral rails, wherein each of the lateral rails has a lower end and an upper end, a support panel having a top end and a bottom end, the support panel pivoting at the top end while remaining fixed with respect to the lateral rails, a rail bracket slidably attached to the lateral rails, a spring operatively connected to the rail bracket, wherein the spring biases the rail bracket in a first position, a cable operatively connected to the rail bracket, wherein the cable pulls the bracket from the first position to a second position, and a lift wire pivotably attaching the support panel to the rail bracket.

20 Claims, 6 Drawing Sheets

U.S. PATENT DOCUMENTS

| | | | |
|---|---|---|---|
| 4,519,646 | A | 5/1985 | Leitermann et al. |
| 4,616,874 | A | 10/1986 | Pietsch et al. |
| 4,619,481 | A | 10/1986 | Grudzinskas |
| 4,630,865 | A | 12/1986 | Ahs |
| 4,634,083 | A | 1/1987 | McKinnon |
| 4,655,505 | A | 4/1987 | Kashiwamura et al. |
| 4,699,418 | A | 10/1987 | Plavetich |
| 4,707,027 | A | 11/1987 | Horvath et al. |
| 4,711,490 | A | 12/1987 | Brand |
| 4,768,830 | A | 9/1988 | Musselwhite |
| 4,826,249 | A | 5/1989 | Bradbury |
| 4,833,614 | A | 5/1989 | Saitoh et al. |
| 4,880,271 | A | 11/1989 | Graves |
| 4,976,104 | A | 12/1990 | Morris et al. |
| 5,026,116 | A | 6/1991 | Dal Monte |
| 5,050,930 | A | 9/1991 | Schuster et al. |
| 5,082,326 | A | 1/1992 | Sekido et al. |
| 5,092,654 | A | 3/1992 | Inaba et al. |
| 5,120,111 | A | 6/1992 | Cook |
| 5,195,795 | A | 3/1993 | Cannera et al. |
| 5,197,780 | A | 3/1993 | Coughlin |
| 5,269,581 | A | 12/1993 | Odagaki et al. |
| 5,292,175 | A | 3/1994 | Artz |
| 5,292,176 | A | 3/1994 | Artz |
| 5,316,371 | A | 5/1994 | Bishai |
| 5,368,355 | A | 11/1994 | Hayden et al. |
| 5,385,389 | A | 1/1995 | Bishai |
| 5,397,167 | A | 3/1995 | Fourrey et al. |
| 5,449,219 | A | 9/1995 | Hay et al. |
| 5,474,358 | A * | 12/1995 | Maeyaert ................. 297/284.7 |
| 5,482,346 | A | 1/1996 | Lesourd |
| 5,529,377 | A | 6/1996 | Miller |
| 5,570,931 | A | 11/1996 | Kargilis et al. |
| 5,588,707 | A | 12/1996 | Bolsworth et al. |
| 5,651,583 | A | 7/1997 | Klingler et al. |
| 5,651,584 | A * | 7/1997 | Chenot et al. ........... 297/284.4 |
| 5,660,438 | A | 8/1997 | Tedesco |
| 5,681,079 | A | 10/1997 | Robinson |
| 5,697,672 | A * | 12/1997 | Mitchell ................. 297/284.4 |
| 5,707,103 | A | 1/1998 | Balk |
| 5,730,495 | A | 3/1998 | Tuman, II |
| 5,911,477 | A * | 6/1999 | Mundell et al. .......... 297/284.4 |
| 5,913,569 | A * | 6/1999 | Klingler .................. 297/284.4 |
| 5,941,602 | A | 8/1999 | Sturt et al. |
| 6,152,531 | A * | 11/2000 | Deceuninck ............. 297/284.4 |
| 6,174,017 | B1 | 1/2001 | Salani et al. |
| 6,179,362 | B1 | 1/2001 | Wisniewski et al. |
| 6,199,951 | B1 | 3/2001 | Zeile et al. |
| 6,338,530 | B1 * | 1/2002 | Gowing .................. 297/284.4 |
| 6,371,558 | B1 | 4/2002 | Couasnon |
| 6,375,255 | B1 | 4/2002 | Maruta et al. |
| 6,499,803 | B2 * | 12/2002 | Nakane et al. ........... 297/284.4 |
| 6,533,357 | B2 | 3/2003 | Pospeshil et al. |
| 6,554,362 | B1 | 4/2003 | Pospeshil |
| 6,595,588 | B2 | 7/2003 | Ellerich et al. |
| 6,655,738 | B2 | 12/2003 | Kämmerer |
| 6,669,299 | B2 | 12/2003 | Carlson et al. |
| 6,685,269 | B1 | 2/2004 | Freijy et al. |
| 6,736,459 | B1 | 5/2004 | Sturt |
| 6,755,476 | B2 * | 6/2004 | Kawashima et al. . 297/284.4 X |
| 6,779,844 | B2 * | 8/2004 | Dosen et al. ............ 297/284.4 |
| 6,905,170 | B2 | 6/2005 | McMillen et al. |
| 6,918,884 | B2 * | 7/2005 | Knelsen et al. ...... 297/284.4 X |
| 2002/0041121 | A1 | 4/2002 | Takata |
| 2002/0125753 | A1 | 9/2002 | Kammerer |
| 2002/0185904 | A1 | 12/2002 | Carlson et al. |
| 2004/0140705 | A1 | 7/2004 | McMillen |
| 2004/0212237 | A1 | 10/2004 | Epaud et al. |
| 2005/0029847 | A1* | 2/2005 | Forkel .................... 297/284.4 |
| 2005/0057081 | A1 | 3/2005 | Kahn et al. |
| 2005/0146186 | A1 | 7/2005 | Kinnou et al. |

FOREIGN PATENT DOCUMENTS

| | | |
|---|---|---|
| DE | 4320105 C1 | 10/1994 |
| DE | 19957965 A1 | 6/2001 |
| GB | 2068216 A | 8/1981 |
| WO | WO0201988 A2 | 1/2002 |

\* cited by examiner

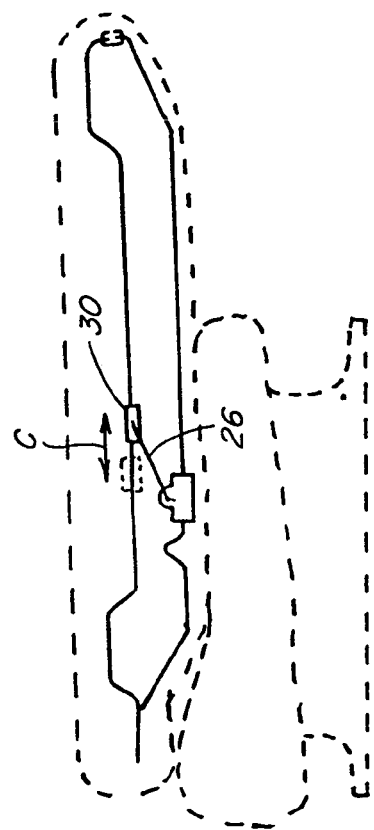
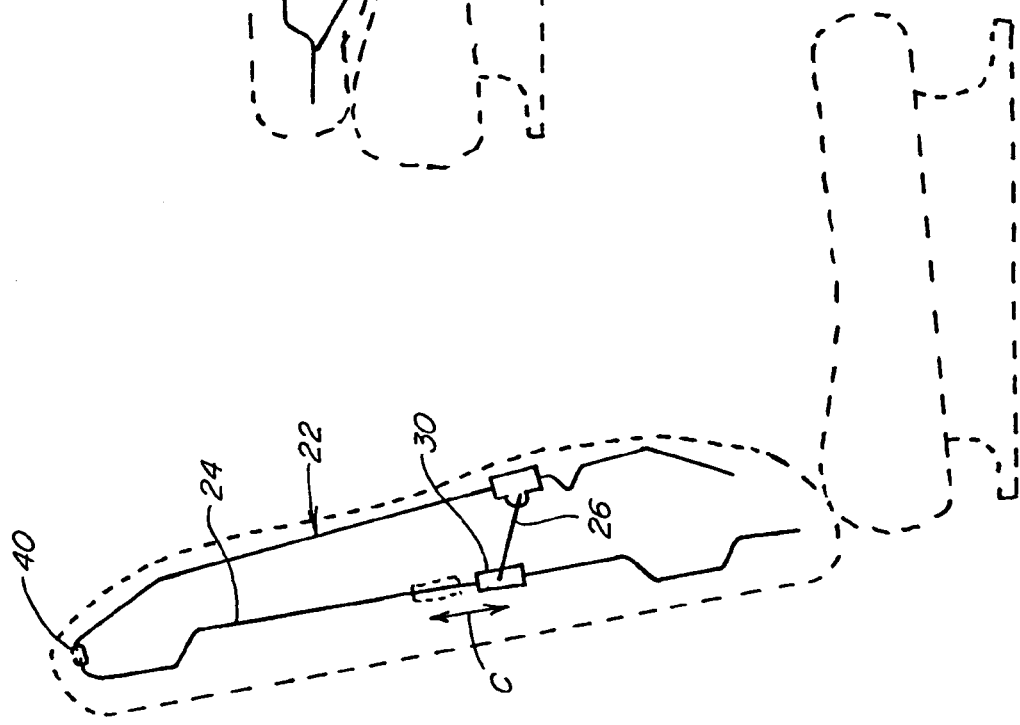

LIFT WIRE LUMBAR

CROSS-REFERENCE TO RELATED APPLICATIONS

None.

BACKGROUND OF THE INVENTION

1. Field of the Invention

The present invention relates to lumbar supports, particularly for use in folding seats of vehicles.

2. Related Art

Fold-down rear seats are a very popular feature in vehicles. The folding of seats to make cargo space available is preferable to having to remove seats completely. To maximize the amount of cargo space available upon folding of the seats, it is preferable to have the seats fold into a very thin profile form. One way to minimize the folded profile of a seat is to reduce the amount of cushioning in the seat. However, at the same time consumers also want the unfolded seats to be comfortable. Thus there is a balance between maintaining seat comfort versus the ability to fold the seat into the most compact form possible.

Further complicating the issue is the consumers' desire to have advanced comfort features such as ergonomic support devices on all of the seats of the vehicle. Many seats, even in the rear passenger positions, contain ergonomic support devices embedded therein to promote passenger comfort. Such devices, for example lumbar supports, typically have three-dimensional forms that support different parts of the body. These three-dimensional forms, however, may limit the degree to which seats containing the ergonomic devices can fold up.

Although some systems have been designed which promote the flattening of ergonomic support devices upon folding of a seat, many such systems are heavy and can be noisy during use, and are complicated and costly to assemble. Furthermore, due to the high spring rate of the springs incorporated into many of these designs, some systems can require a large amount of force to fold the seat down. The higher spring rate requires the use of heavier gauge components, which of course weigh more, and places more stress on the system's components over the long term.

The purpose of the present invention is to provide back support for a seat occupant, plus fold to a very thin profile when the seat is in the stowed position, while solving one or more of the above-identified problems.

SUMMARY OF THE INVENTION

In one aspect the invention is an adjustable lumbar support for a seat comprising a pair of parallel lateral rails, wherein each of the lateral rails has a lower end and an upper end, a support panel having a top end and a bottom end, the support panel pivoting at the top end while remaining fixed with respect to the lateral rails, a rail bracket slidably attached to the lateral rails, a spring operatively connected to the rail bracket, wherein the spring biases the rail bracket in a first position, a cable operatively connected to the rail bracket, wherein the cable pulls the bracket from the first position to a second position, and a lift wire pivotably attaching the support panel to the rail bracket.

In another aspect the invention is an adjustable lumbar support for a seat comprising a pair of parallel lateral rails, wherein each of the lateral rails has a lower end and an upper end, a lower base wire fixedly attached to the lower ends of the lateral rails, a support panel having a top end and a bottom end, the support panel pivoting at the top end while remaining fixed with respect to the lateral rails, a rail bracket slidably attached to the lateral rails, a spring operatively connected to the rail bracket, wherein the spring biases the rail bracket in a first position, a cable operatively connected to the rail bracket, wherein the cable pulls the bracket from the first position to a second position, and a lift wire pivotably attaching the support panel to the rail bracket, wherein the cable is slidably disposed within a conduit, a first end of the cable being fixedly attached to the rail bracket, a first end of the conduit being operably connected to the lateral rails, a second end of the cable and a second end of the conduit being operably attached to an actuator, wherein upon actuation the actuator increases tension on the cable thereby shortening the first end of the cable and causing folding of the support panel.

In yet another aspect the invention is a method of folding a lumbar support, comprising providing a pair of lateral rails, each rail having a top end and a bottom end, providing a support panel having a top end and a bottom end, wherein the support panel pivots at the top end while the top end remains fixed with respect to the lateral rails, slidably attaching a rail bracket to the lateral rails, operatively connecting a spring to the rail bracket wherein the spring biases the rail bracket in a first position, operatively connecting a cable to the rail bracket to pull against the force of the spring, providing a lift wire pivotably attached to the rail bracket and pivotably attached to the support panel, and pulling the cable so as to move the rail bracket from the first position to a second position.

A method of folding a lumbar support, comprising providing a pair of lateral rails, each rail having a top end and a bottom end, providing a pivoting support panel, slidably attaching a rail bracket to the lateral rails, operatively connecting a spring to the rail bracket wherein the spring biases the rail bracket in a first position, operatively connecting a cable to the rail bracket to pull against the force of the spring, providing a lift wire pivotably attached to the rail bracket and pivotably attached to the support panel, and pulling the cable so as to move the rail bracket from the first position to a second position, thereby causing the support panel to move closer to the lateral rails.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 2A and 2B show a side view of the lift wire lumbar in a seat that is unfolded and folded, respectively;

DETAILED DESCRIPTION OF THE PREFERRED EMBODIMENTS

The following description of the preferred embodiment(s) is merely exemplary in nature and is in no way intended to limit the invention, its application, or uses.

Figure 1:
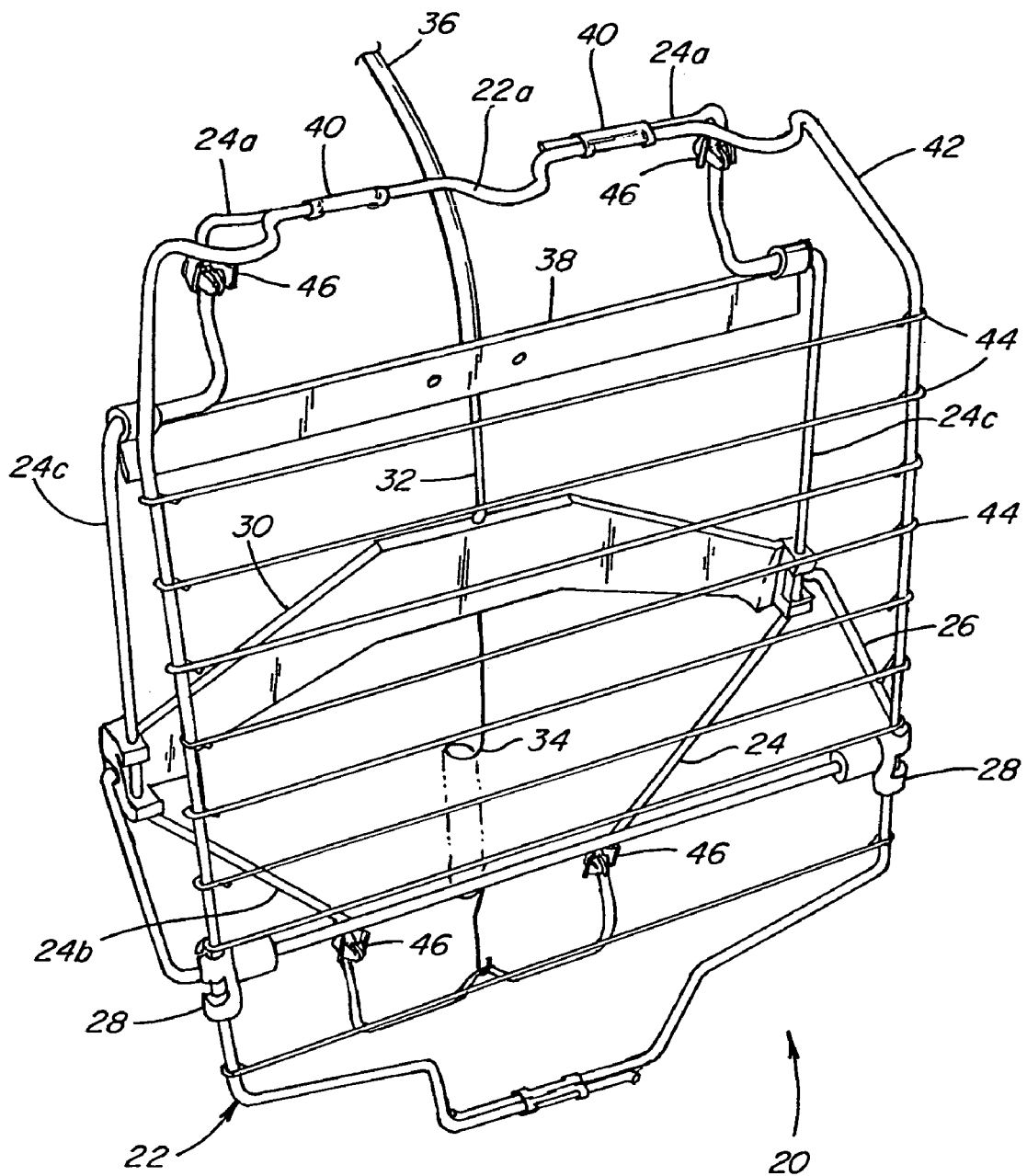
FIG. 1 shows a perspective view of one embodiment of a lift wire lumbar assembly according to the present invention.

In one embodiment a lift wire lumbar 20 comprises a grid 22 pivotably attached to a base wire 24 (FIG. 1). Grid 22 is pivotably attached to a lift wire 26 via a pivot bracket 28 at a distance from the lower end of grid 22. Lift wire 26 is also pivotably attached to a rail bracket 30. Rail bracket 30, in turn, is slidably attached to base wire 24, along the two parallel side portions thereof, the side portions also called lateral rails 24*c*. Grid 22 pivots relative to base wire 24 at pivot points 40. When the lift wire lumbar system is installed in a vehicle seat, appropriate connections are made between the frame of seat back 60 and base wire 24. Thus in use base wire 24 remains relatively stationary in relation to the frame of seat back 60 while grid 22 moves under various conditions, for example upon folding and unfolding of the seat. Base wire 24 is attached to a seat frame 58 by various known means, for example using attachment clips 46 which wrap around base wire 24 and which comprise integral snap-in fasteners.

In general lift wire lumbar 20 comprises a support panel that is capable of supporting a seat occupant, the panel being pivotably attached to seat back 60 and pivotably attached to lift wire 26. Lift wire 26 in turn is itself pivotably attached to rail bracket 30, which is slidably attached to lateral rails 24*c*. In the embodiment described herein the support panel comprises grid 22 and grid 22 is pivotably attached to base wire 24, of which lateral rails 24*c* form a part. In a preferred embodiment grid 22 pivots at its top end 22*a* (FIG. 1).

Base wire 24 can assume various configurations provided that base wire 24 comprises a pair of lateral rails 24*c* and a means for securing these to seat back 60. In one embodiment base wire 24 also comprises an upper base wire 24*a* portion and a lower base wire 24*b* portion connected to lateral rails 24*c* (FIG. 1).

Grid 22 comprises a frame 42 across which are attached a series of approximately parallel horizontal crosswires 44. Frame 42 consists of two roughly parallel side portions joined by top and bottom portions. It is crosswires 44 that primarily support the seat occupant's back, although in the lumbar region lift wire 26 may also contribute to supporting the occupant's back, depending on the particular design of lift wire 26 that is employed. In one embodiment lift wire 26 is attached to a point closer to the bottom of grid 22, thereby giving greater support to the lumbar region of the occupant's back.

Figure 6A:
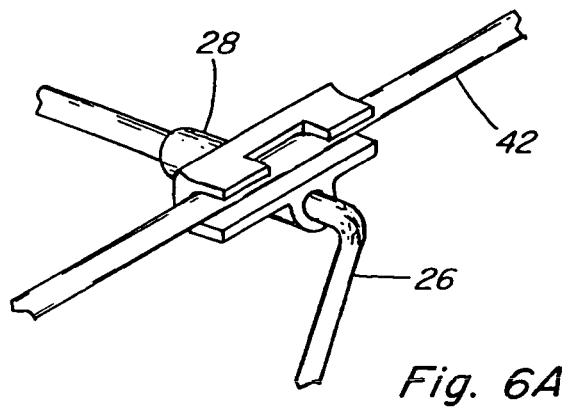
FIGS. 6A through 6D show possible configurations of the pivot bracket, which vary depending on whether the bracket clips or threads onto the lift wire and frame wire.
Figure 6C:
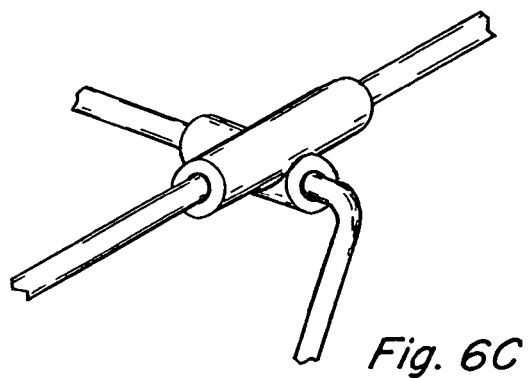
Figure 6B:
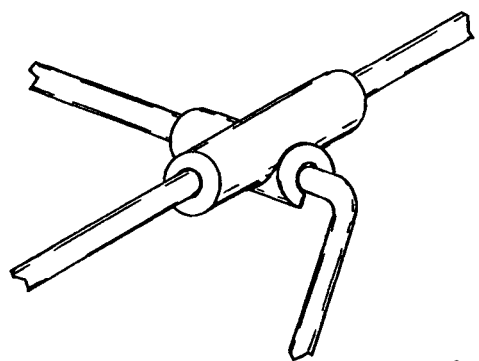
Figure 6D:
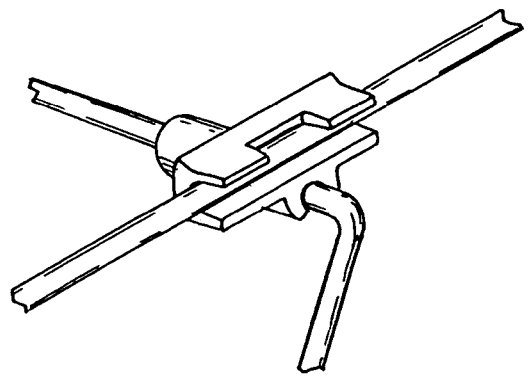

Pivot bracket 28 can be designed to attach to grid 22 in several different ways (FIGS. 6A-6D). Pivot bracket 28 can snap onto lift wire 26 and the border of grid 22 (FIG. 6D), or can alternatively be designed with a hole through which lift wire 26 and the border of grid 22 are threaded (FIG. 6C), or a combination of both (FIGS. 6A, 6B). In the embodiment shown in FIG. 6A, pivot bracket 28 snaps onto frame 42 of grid 22 while lift wire 26 is threaded through pivot bracket 28. With any method, an important feature is that pivot bracket 28 is held firmly onto grid 22, so that it does not move in relation to the border of grid 22, while permitting lift wire 26 to pivot relative to pivot bracket 28.

Lift wire 26 can be a single wire that extends between the two pivot brackets 28 and down to interact with rail bracket 30 (FIG. 1). Alternatively lift wire 26 may extend between the two pivoting points on rail bracket 30 and extend forward to interact with pivot brackets 28, leaving the space between pivot brackets 28 open. In another alternative, lift wire 26 may consist of two separate pieces, each of which extends only between one pivot bracket 28 and the corresponding end of rail bracket 30. Finally, lift wire 26 may be a complete rectangular piece of wire that extends between both pivot brackets 28 and both ends of rail bracket 30.

In response to folding and unfolding of the seat back 60 in which lift wire lumbar 20 is installed, rail bracket 30 moves up and down along base wire 24, respectively, causing lift wire 26 to pivot relative to pivot bracket 28 which in turn causes grid 22 to fold and unfold (see arrow C in FIGS. 2A, 2B). Rail bracket 30 is preferably pulled up by a cable 32, against the tension of an extension spring 34, and pulled down by spring 34 when the tension on cable 32 is released. Cable 32 is housed in a conduit 36 and slides axially therein. One end of conduit 36 is operably connected to base wire 24. In one embodiment a cross support 38 is attached to base wire 24 for the purpose of anchoring an end of conduit 36. Cable 32 at this end of conduit 36 is fixedly attached to rail bracket 30. Also attached to rail bracket 30 is one end of spring 34. The opposite end of spring 34 in one embodiment is fixedly attached to the non-pivoting end of base wire 24 (FIG. 1). In a preferred embodiment cable 32 and conduit 36 are of a type commonly referred to as "Bowden" cables wherein cable 32 and conduit 36 are flexible.

Figure 4:
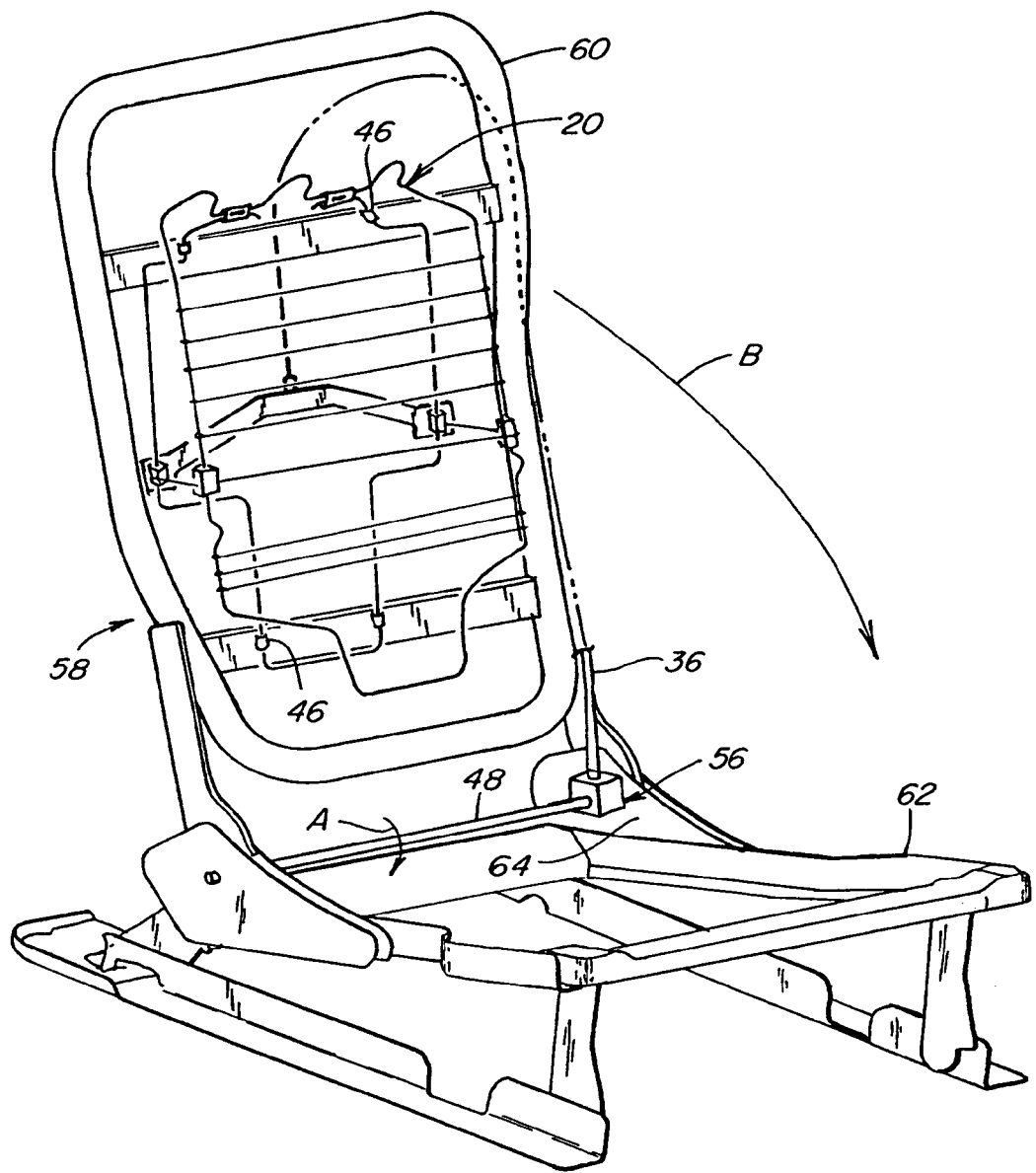
FIG. 4 shows a seat frame with a folding-activated actuator attached.
Figure 5:
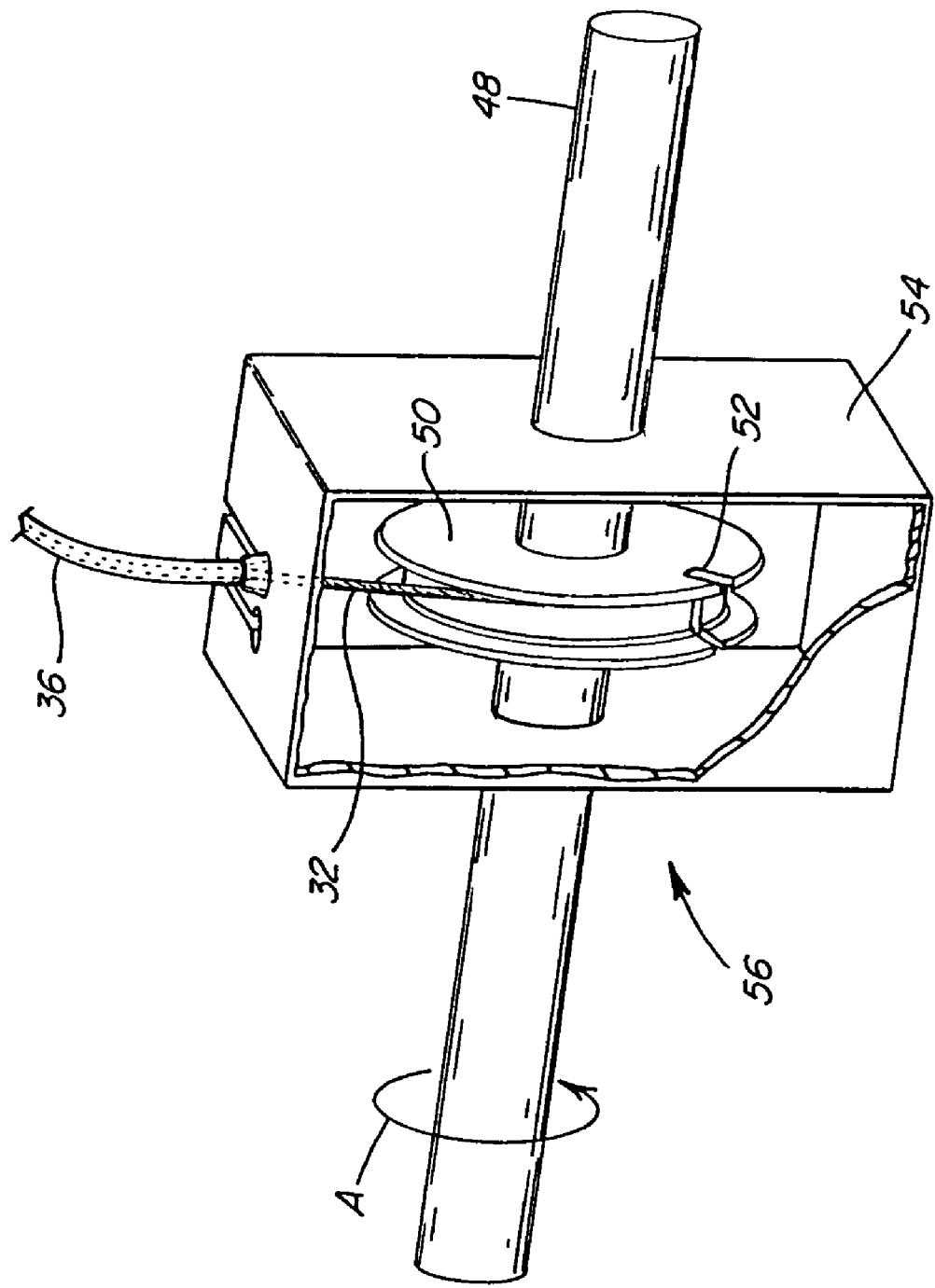
FIG. 5 shows a close-up, cutaway view of one embodiment of an actuator.

The other end of conduit 36 and cable 32 are anchored to an actuator 56 (FIGS. 4 and 5). Actuator 56 may be of a conventional motor- or manually-operated design, or in a preferred embodiment is driven by the folding movement of a seat frame 58 (FIGS. 4 and 5). The other end of conduit 36 and cable 32 are anchored to actuator 56 which is integrated into seat frame 58 such that folding of seat back 60 towards seat bottom 62 increases tension in cable 32, shortening cable 32 and leading to cable 32 pulling on rail bracket 30, which ultimately leads to folding of grid 22 into a more compact conformation. The length of the lateral portions of lift wire 26 plus the amount of travel on the parallel side portions of base wire 24 will determine the amount of movement of grid 22 in response to pivoting of lift wire 26.

FIG. 5 shows one possible mechanism for generating tension on, and subsequently shortening, cable 32 in response to folding down of a seat back 60. Cable 32 is fixedly attached to the front of a torsion bar 48, optionally to a pulley 50 which itself is fixedly attached to torsion bar 48. Having an intervening pulley 50 permits adjustment of the length of cable 32 that is taken up upon folding of the seat, by varying the radius of pulley 50. Similar adjustment can be made by varying the radius of torsion bar 48 if pulley 50 is omitted. If pulley 50 is employed, the end of cable 32 can be attached to pulley 50 via a notch 52 on pulley 50, into which an attachment at the end of cable 32, such as a bullet, can be inserted. In the absence of pulley 50, other well-known means can be used to securely attach the end of cable 32 to torsion bar 48.

The attachment point of cable 32 to torsion bar 48, with or without pulley 50, is contained within a housing 54. Conduit 36 is operably attached to housing 54 such that conduit 36 will not enter housing 54 under the levels of tension expected to be present during use of the system described herein. In one embodiment housing 54 is fixedly attached to a non-folding portion of the seat frame 64 while torsion bar 48 is fixedly attached to the folding portion, which in one embodiment is seat back 60. Upon folding down of the seat back (arrow B in FIG. 4), torsion bar 48 rotates forward (see direction indicated by arrows A in FIGS. 4 and 5) while housing 54 and conduit 36 remain stationary. Rotation of torsion bar 48 and the optional pulley 50 therewith increases tension on, and consequently shortens, cable 32. As torsion bar 48 or pulley 50 rotates, a given length of cable 32 is wrapped onto torsion bar 48 or pulley 50 thereby shortening the effective length of cable 32 by the amount taken up by torsion bar 48 or pulley 50. Since housing 54 is fixed with respect to torsion bar 48 or pulley 50, as cable 32 begins to shorten it moves axially within conduit 36. Because cable 32 slides axially within conduit 36, the shortening of cable 32 at the end proximal to the torsion bar 48 causes shortening at the opposite end, leading to upward movement of rail bracket 30 and thus to folding of grid 22 relative to base wire 24 via lift wire 26. The extent of shortening of cable 32 depends on the amount of angular movement of torsion bar 48 relative to housing 54 as well as the radius of the object around which cable 32 is wrapped, either pulley 50 or torsion bar 48.

Comparable results are also obtained if torsion bar 48 is held fixed while housing 54 moves with the folding portion of the seat, provided that cable 32 is wrapped around the back side of torsion bar 48 or pulley 50.

In one embodiment rail bracket 30 slides up and down along base wire 24, causing lift wire 26 to pivot relative to grid 22. When rail bracket 30 moves upward, this moves lift wire 26 into a position that is closer to being parallel to grid 22. What is meant by "closer to being parallel," which is also referred to herein as "substantially parallel," is that the angle between lift wire 26 and the lateral rails of base wire 24 is less than 45°. This in turn causes grid 22 to fold into a more compact conformation.

When rail bracket 30 slides downward this causes lift wire 26 to move into a position that is closer to being perpendicular to grid 22. What is meant by "closer to being perpendicular," which is also referred to herein as "substantially perpendicular," is that the angle between lift wire 26 and the lateral rails of base wire 24 is at least 45° and no more than 90°. This places grid 22 into its activated position, in which grid 22 can support a seat occupant.

In one embodiment lift wire 26 when in its activated position is closer to being perpendicular to base wire 24 and grid 22. By having lift wire 26 closer to a perpendicular angle relative to base wire 24 and grid 22, this transfers more of the force required to hold grid 22 in its unfolded, activated position directly from grid 22 to lift wire 26 to base wire 24 with less of a requirement for spring 34 to hold rail bracket 30 and lift wire 26 in place. This relatively high angle orientation of lift wire 26 permits the use of a spring with a relatively low spring rate. This lower spring rate, in turn, allows the seat to be folded using less force. Overall, the lower spring tension required by this system permits the use of lighter-weight components and less wear on the system.

In a preferred embodiment lift wire 26 when in its activated, unfolded position is nonetheless at an angle relative to base wire 24 and grid 22 of less than 90°, i.e. an acute angle, which permits lift wire 26 to collapse readily under high impact, for example as could result from a vehicle collision. In one embodiment this angle is 60°.

Figure 3:
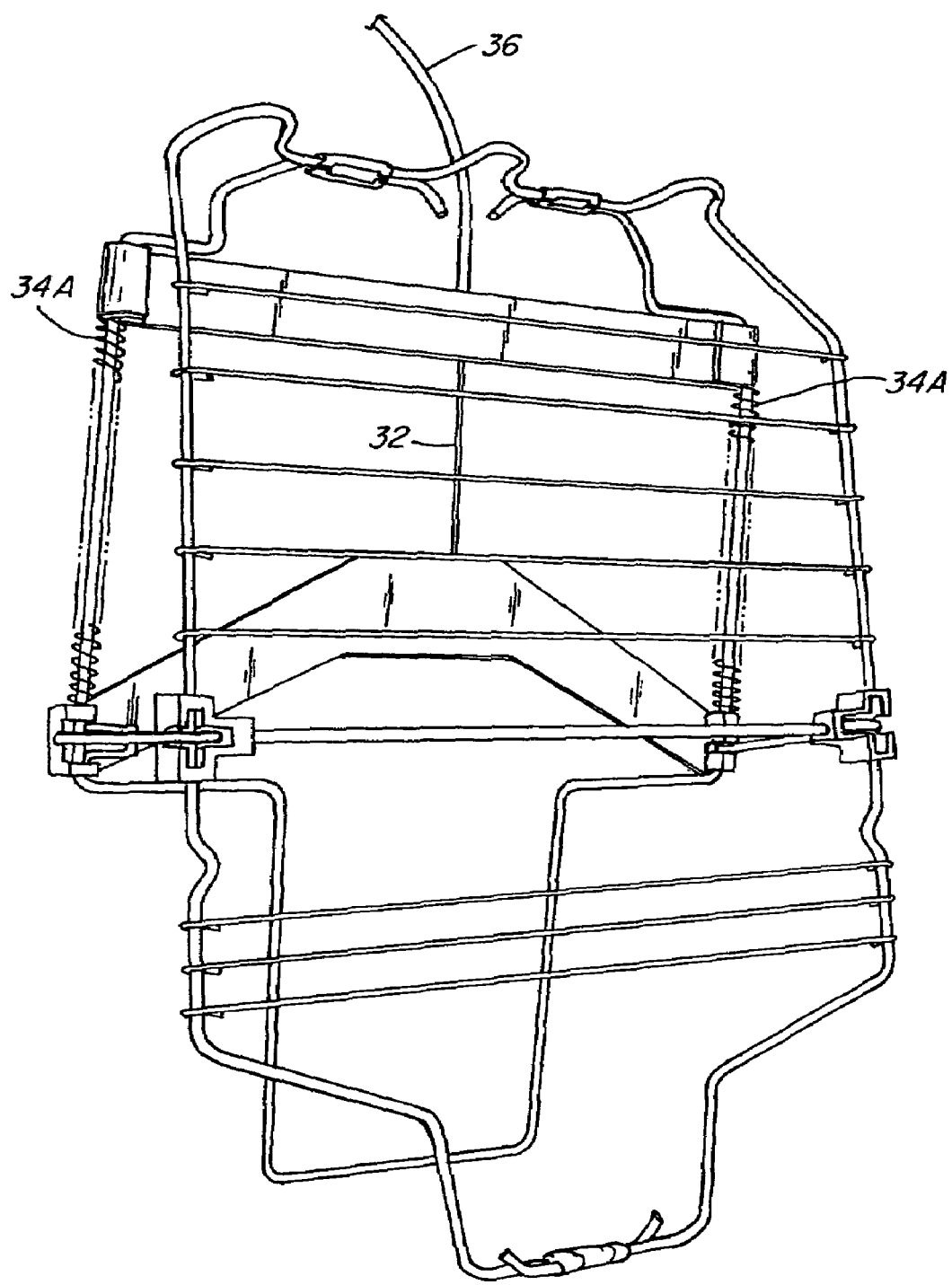
FIG. 3 shows a perspective view of another embodiment of a lift wire lumbar assembly according to the present invention.

In an alternative embodiment, instead of having a single, centrally-located extension spring between rail bracket 30 and the lower end of base wire 24 as shown in FIG. 1, there can be one or a pair of compression springs 34A axially mounted on the side rails of base wire 24 between rail bracket 30 and the top end of base wire 24 (FIG. 3).

The lift wire plays a critical part in the design of the system. The lift wire can be installed with the portion connecting the side pieces of the lift wire attached to the pivot brackets. This will provide firm support in the lumbar area. The lift wire can be installed with the connecting portion that connects the side portions of the wire attached to the rail wires in the grid, plus the location of the connecting portion of the lift wire enable the design to easily accommodate the requirements for occupant back support.

As stated above, the combination of the angle of the lift wire compared to the base wire and grid, plus the spring rate of the spring, will determine the force the unit can support and also the force required for stowing the unit. When the lift wire is near 90 degrees to the base and the grid border wires, it takes a small amount of force on the base bracket to support the grid in the extended position. This small force enables the use of a spring with a low spring rate. When the unit is collapsed for the stow position, the low spring rate allows a small amount of force on the cable and a small force on the seat back by either a person or a powered back unit. Also note that when the angle of the lift wires goes from near 90 degrees to near 0 degrees to the base wire, the force of the spring increases on the base bracket; the change in angle of the lift wire enables a much smaller load on the grid to collapse the unit. The force on the grid will happen when the seat back is being forced against the seat cushion for the stowed position. The lighter spring rate results in lighter components and less wear for the system. The lift wire is designed to be near 90 degrees during occupancy of the seat. However, movement would not be detrimental to the unit.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An adjustable lumbar support for a seat comprising:
   a pair of parallel lateral rails, wherein each of said lateral rails has a lower end and an upper end;
   a support panel having a top end and a bottom end, said top end of said support panel pivotally attached to upper ends of said lateral rails, said support panel being pivotal at said top end while remaining fixed in place with respect to said lateral rails;
   a rail bracket slidably attached to said lateral rails;
   a spring operatively connected to said rail bracket, wherein said spring biases said rail bracket in a first position;
   a cable operatively connected to said rail bracket, wherein said cable pulls said bracket from said first position to a second position; and
   a lift wire pivotably attaching said support panel to said rail bracket.

2. The lumbar support of claim 1 further comprising:
   a lower base wire fixedly attached to said lower ends of said lateral rails;
   wherein said spring comprises an extension spring, such that a first end of said extension spring is fixedly attached to said rail bracket and a second end of said extension spring is fixedly attached to said lower base wire.

3. The lumbar support of claim 2 wherein said support panel comprises a support grid, said support grid comprising a frame having a plurality of horizontally-oriented cross-wires attached thereto.

4. The lumbar support of claim 2 further comprising an upper base wire fixedly attached to said upper ends of said lateral rails, wherein said support panel is pivotably attached to said upper base wire.

5. The lumbar support of claim 2 wherein said cable is slidably disposed within a conduit, a first end of said cable being fixedly attached to said rail bracket, and a first end of said conduit being held fixed relative to said lateral rails.

6. The lumbar support of claim 3 wherein said first end of said conduit is operably connected to said lateral rails by a cross support fixedly attached to said lateral rails.

7. The lumbar support of claim 5, further comprising:
a second end of said cable and a second end of said conduit being operably attached to an actuator, wherein upon actuation said actuator increases tension on said cable thereby shortening said first end of said cable and causing folding of said support panel, wherein said actuator is a frame of a folding seat, such that folding of said seat increases tension on said cable.

8. The lumbar support of claim 1 wherein said top end of said support panel is vertically fixed with respect to said lateral rails, said top end comprising a non-sliding pivot point.

9. The lumbar support of claim 1 wherein said spring is a compression spring axially mounted on one of said lateral rails, operably connected to said rail bracket, and operably connected to at least one of said upper ends of said lateral rails.

10. The lumbar support of claim 1 wherein said first position of said rail bracket corresponds to an extended position of said lumbar support wherein said support panel is extended away from said lateral rails, and said second position of said rail bracket corresponds to a folded position of said lumbar support wherein said support panel is closer to said lateral rails than in said extended position.

11. The lumbar support of claim 1 wherein said lift wire pivotably attaches to said support panel with a non-sliding pivot bracket.

12. The lumbar support of claim 11 wherein said pivot bracket is snappingly attached to said support panel.

13. The lumbar support of claim 11 wherein said pivot bracket is snappingly attached to said lift wire.

14. An adjustable lumbar support for a seat comprising:
a pair of parallel lateral rails, wherein each of said lateral rails has a lower end and an upper end;
a lower base wire fixedly attached to said lower ends of said lateral rails;
a support panel having a top end and a bottom end, said top end of said support panel pivotally attached to said upper ends of said lateral rails, said support panel being pivotal at said top end while remaining vertically fixed in place with respect to said lateral rails;
a rail bracket slidably attached to said lateral rails;
a spring operatively connected to said rail bracket, wherein said spring biases said rail bracket in a first position, and wherein said spring is selected from the group consisting of an extension spring having a first end fixedly attached to rail bracket and a second end fixedly attached to said lower base wire, and a compression spring axially mounted on one of said lateral rails, operably connected to stud rail bracket, and operably connected to at least one of said upper ends of said lateral rails;
a cable operatively connected to said rail bracket, wherein said cable pulls said bracket from said first position to a second position; and
a lift wire pivotably attaching said support panel to said rail bracket;
wherein said cable is slidably disposed within a conduit, a first end of said cable being fixedly attached to said rail bracket, a first end of said conduit being operably connected to said lateral rails, a second end of said cable and a second end of said conduit being operably attached to an actuator, wherein upon actuation said actuator increases tension on said cable thereby shortening said first end of said cable and causing folding of said support panel.

15. The adjustable lumbar support of claim 14 wherein said actuator is a frame of a folding seat, such that folding of said seat increases tension on and shortens said cable.

16. The adjustable lumbar support of claim 14 wherein said top end of said support panel is vertically fixed with respect to said lateral rails, said top end comprising a non-sliding pivot point.

17. The adjustable lumbar support of claim 14 wherein said lift wire pivotably attaches to said support panel with a non-sliding pivot bracket.

18. A method of folding a lumbar support, comprising:
providing a pair of lateral rails, each rail having a top end and a bottom end;
providing a support panel having a top end and a bottom end, pivotally attaching said top end of said support panel to said upper ends of said lateral rails, wherein said support panel is pivotal at said top end while said top end remains vertically fixed in place with respect to said lateral rails;
slidably attaching a rail bracket to said lateral rails;
operatively connecting a spring to said rail bracket wherein said spring biases said rail bracket in a first position;
operatively connecting a cable to said rail bracket to pull against the force of said spring;
providing a lift wire pivotably attached to said rail bracket and pivotably attached to said support panel; and
pulling said cable so as to move said rail bracket from said first position to a second position, thereby causing said support panel to move closer to said lateral rails.

19. The method of claim 18 further comprising providing a lower base wire fixedly attached to said lower ends of said lateral rails, wherein said spring is selected from the group consisting of an extension spring having a first end fixedly attached to said rail bracket and a second end fixedly attached to said lower base wire, and a compression spring axially mounted on one of said lateral rails, operably connected to said rail bracket, and operably connected to at least one of said top ends of said lateral rails, and wherein upon increasing tension on said cable, said rail bracket is pulled towards said top ends of said lateral rails.

20. The method of claim 18 wherein said top end of said support panel comprises a non-sliding pivot point and in said extended configuration said lift wire is at an acute angle with respect to said rail bracket and to said support grid.

* * * * *